(12) United States Patent
Allen

(10) Patent No.: US 7,309,076 B2
(45) Date of Patent: Dec. 18, 2007

(54) TOWING HITCH ASSEMBLY

(76) Inventor: Daniel L. Allen, 4815 N. Meadow Ridge Cir., McKinney, TX (US) 75070-5235

( * ) Notice: Subject to any disclaimer, the term of this patent is extended or adjusted under 35 U.S.C. 154(b) by 181 days.

(21) Appl. No.: 11/186,028

(22) Filed: Jul. 21, 2005

(65) Prior Publication Data

US 2007/0018428 A1     Jan. 25, 2007

(51) Int. Cl.
*B60D 1/36* (2006.01)
(52) U.S. Cl. ............... 280/477; 280/478.1; 280/511; 280/416.1; 280/498
(58) Field of Classification Search .......... 280/477, 280/478.1, 511, 416.1, 498
See application file for complete search history.

(56) References Cited

U.S. PATENT DOCUMENTS

| | | | | |
|---|---|---|---|---|
| 5,044,652 A | * | 9/1991 | Brisson | 280/416.1 |
| 5,322,313 A | * | 6/1994 | Schroeder | 280/416.1 |
| 5,560,630 A | * | 10/1996 | Phares et al. | 280/416.1 |
| 5,857,693 A | * | 1/1999 | Clark, Jr. | 280/415.1 |
| 5,890,727 A | * | 4/1999 | May | 280/416.1 |
| 6,315,316 B1 | * | 11/2001 | Wyant | 280/511 |
| 6,497,428 B2 | * | 12/2002 | Ross | 280/415.1 |
| 7,021,643 B1 | * | 4/2006 | Buchanan | 280/416.1 |

* cited by examiner

*Primary Examiner*—Lesley D. Morris
*Assistant Examiner*—Marlon Arce-Diaz
(74) *Attorney, Agent, or Firm*—William Daniel Swayze, Jr.

(57) ABSTRACT

A hitch assembly to be connected between a tow vehicle and a trailer includes a first shaft adapted to be attached to said tow vehicle, the first shaft being stationary with respect to the tow vehicle, a second shaft for mounting a ball to accept the trailer and being rotatable about the first shaft, wherein the first shaft and the second shaft are rotatable connected to rotate with respect to each other. A hitch assembly adapted to be connected between the tow vehicle and the trailer additionally includes a first shaft adapted to be attached to the tow vehicle, the first shaft being at a fixed relationship with respect to the tow vehicle and to rotate about an axis of the first shaft and a second shaft for mounting a ball to accept said trailer and being rotatable about the first shaft.

22 Claims, 5 Drawing Sheets

TOWING HITCH ASSEMBLY

FIELD OF THE INVENTION

The present invention relates to trailers and tow vehicles and more particularly to a hitch assembly for coupling the trailer to the tow vehicle.

BACKGROUND

Automobiles and trucks including pickup trucks, known hereafter as tow vehicles, have long been used to tow trailers. Typically, the tow vehicle has a ball and socket coupling mounted on the rear of the tow vehicle. The ball which may be known as a hitch ball projects upwards in the vicinity of the rear bumper of the tow vehicle. The trailer typically has a tongue which has a socket which fits over and closes around the hitch ball to secure the trailer to the tow vehicle so that the trailer may turn relative to this tow vehicle by the socket rotating with respect to the hitch ball. Furthermore, the trailer can rock forward or rock rearward with respect to the tow vehicle and rock right and left with respect to the tow vehicle for forming a universal pivotal movement.

The offset of the hitch from the rear axle of the tow vehicle reduces the overall stability of the combination of trailer and tow vehicle. At the higher tow vehicle speeds, this loss in stability is increased, and at these higher speeds, wind induced forces against the trailer can cause a swaying motion known as fish tailing. Similar to the effect of wind, air turbulence can cause fish tailing and can be gentle or severe; this air turbulence may be generated by large other vehicles traveling at high rates of speed. Some vehicles displace a large amount of air and create turbulence that affects all vehicles which happen to be near it. Inertial forces created by uneven road surfaces may also induce fish tailing. If one wheel of the trailer or tow vehicle is riding on the shoulder, when the wheel returns to the pavement, the trailer will be subject to a sudden jolt which may induce fish tailing.

Regardless of a source of the fish tailing, fish tailing is dangerous because it may cause the driver of the tow vehicle to lose control of both the tow vehicle and the trailer. Additionally, fish tailing induces severe stresses on the trailer hitch and frame components of both the tow vehicle and the trailer and may cause damage or failure. Fish tailing imposes severe demands on the suspension system of the tow vehicle and may cause components such as shock absorbers, bushings and springs excessive wear or even failure.

From the above discussion, it would seem logical that large over the road tractor-trailer vehicles would because of their large size be more susceptible to fish tailing; however, because the pivot axes for the trailer is substantially over the real axle of the tractor, the tractor-trailer vehicles are generally more stable. The hitch for the tractor-trailer is located near the rear axle of the tractor, and consequently these tractor-trailers exhibit stability at high speeds.

There are currently devices available for reducing swaying and fish tailing; however, these devices tend to stiffen the pivoting ability of the hitch and socket. Additionally, these devices are not very effective and result in stress being applied to the tow vehicle and to trailer to which they are attached. This stress is especially strong while the tow vehicle and trailer are turning sharply while parking. Attempts have been made to stabilize trailers by employing converging links in the hitch mechanism and these links have the effect of displacing the effective pivot axes for the hitch mechanism in the forward direction despite the fact that the hitch is not located at the position where the axis is displaced. One such link arrangement is shown in U.S. Pat. No. 4,019,754 to Hinckley. These types of link arrangements cannot accommodate 90 degree turns and consequently are of limited value in urban areas or areas of confined parking. Another patent which deals with the above-mentioned subject matter is U.S. Pat. No. 4,722,542 to Hensley. Hensley discloses a complicated hitch assembly having a set of complicated parts which add cost. This hitch assembly requires properly tuned electric brakes on trailers and produces undesirable tracking in sharp turns.

SUMMARY

The towing hitch assembly of the present invention provides an articulated joint between the tow vehicle and the trailer so that as a result of the articulated joint between the tow vehicle and the trailer, the trailer tracks the tow vehicle in a favorable way. The tracking for small changes in the tow vehicle resulting from small steering adjustments is improved, and the tow vehicle reaction to wind forces or roadway surface conditions is improved. For small turning angles or angles of articulation, the hitch provides inside tracking by the trailer thereby preventing the tendency of the tow vehicle and trailer to sway. The tracking for large position changes in the tow vehicle that are caused by sharp corner turning or slow speed positioning of the trailer approximates the tow vehicle, minimizing the amount of clearance space required for the tow vehicle and the trailer to complete a sharp turn.

This favorable tracking is achieved without providing an apparatus that stiffens the tow hitch assembly and without uncommon requirements for measuring and dividing the gross weight between the tongue of the trailer and the axle(s) of the trailer. Concerning special requirements, the industry practice calls for about 10-15% of the gross towed weight to be felt by the trailer tongue.

The present invention provides for infinitely variable positioning distance and the hitch assembly, does not require any brakes, and neither requires or precludes the use of surge brakes on the trailer. The hitch assembly of the present invention provides for optional chain tensioning via eccentric shaft mount requiring no idler sprocket. The hitch assembly of the present invention provides a compact rotating arm/casing combination for strength, simplicity, and isolation from the environment. The present invention is easily manufactured requiring minimal parts and consequently can be offered at a reasonable price to users. The present invention is reliable and serviced with minimal user maintenance.

DETAILED DESCRIPTION

Figure 1:
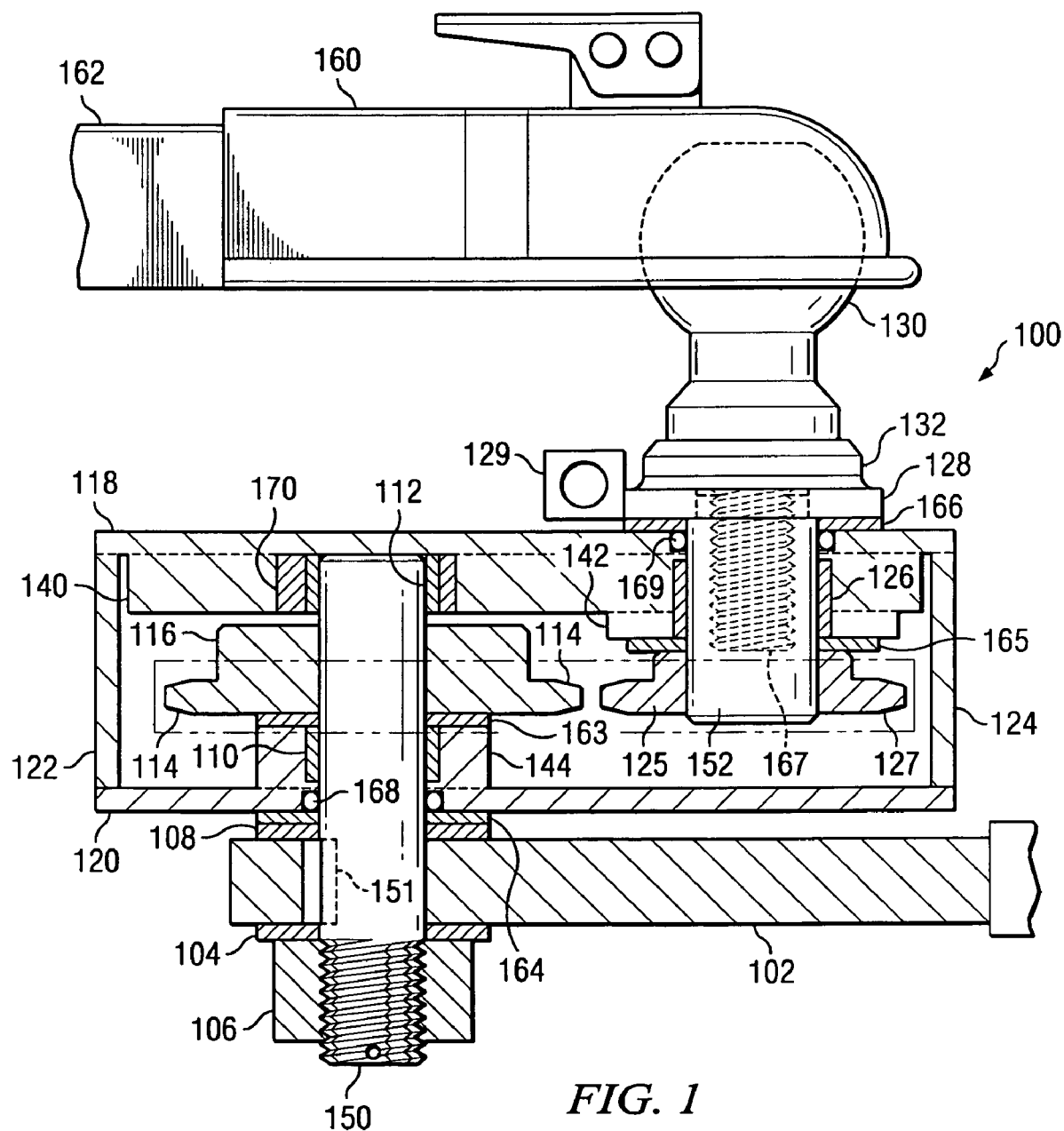
FIG. 1 illustrates a side view of the hitch assembly.

FIG. 1 shows the hitch assembly 100 including a substantially rectangular housing including top plate 118, bottom plate 120, left side plate 122 and right side plate 124. The hitch assembly 100 includes a first journal housing 140 attached to the top plate 118 for securing the first shaft 150 and includes a second journal housing 142 attached to the first journal housing 140 for securing the second shaft 152. The hitch assembly 100 additionally includes journal bearing 112 to accept the first shaft 150. The journal bearing 112 rotates about the first shaft 150 since the first shaft 150 is connected to the tow bar 102 and consequently connected to the tow vehicle. The bottom plate 120 is attached to a bottom journal housing 144 which includes journal bearing 110. The journal bearing 110 allows the housing of the hitch assembly 100 to rotate around the first shaft 150. The first shaft 150 includes a shaft key 151 to connect and secure the first shaft 150 to the tow bar 102. The tow bar 102 is connected to the tow vehicle. The first shaft 150 is attached to the tow bar 102 by nut 106. The nut 106 includes a washer 104 to abut the tow bar 102. The first shaft 150 includes threads to accept the nut 106. The torquing nut 106 draws downward on gear 116 and applies a compression force to preload thrust washers 163 and 164. A cotter pin may be used so that nut 106 does not come off the first shaft 150. A washer 108 is positioned between the tow bar 102 and the thrust washer 164. The thrust washer 163 is positioned against the gear 116 which includes gear teeth 114. The gear 116 drives a gear chain to rotate the housing of the hitch assembly 100 with respect to the stationary first shaft 150. FIG. 1 additionally shows a tongue 160 connected the tow vehicle and trailer 162.

Figure 8:
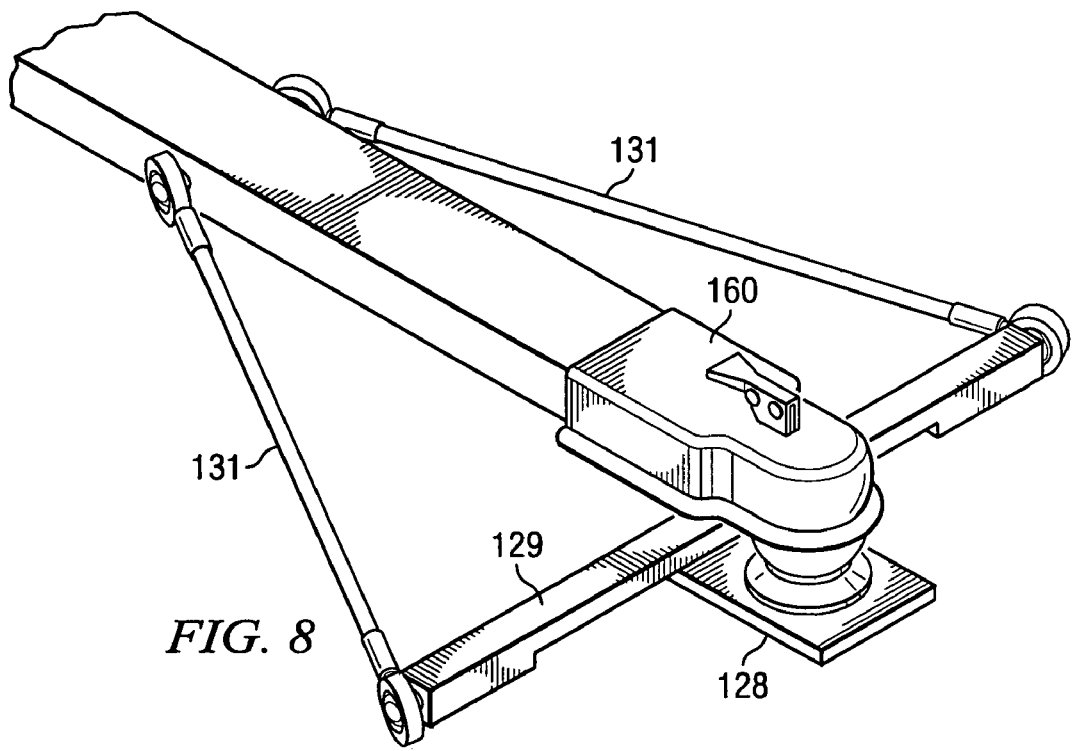
FIG. 8 illustrates a perspective view of the torque bar.

The hitch assembly 100 additionally includes a second shaft 152 which rotates with the housing of the hitch assembly 100 in response to articulation of the tow vehicle and trailer joint. The second shaft 152 includes a hitch ball 130 positioned above the second shaft 152 to connect to the trailer and includes a shoulder 132 positioned against the torque bar 128. The torque bar 128 rotates with the second shaft 152 and has two ends of the torque bar 128 attached to two struts 131 (as shown in FIG. 8) that attach to the tongue 160 of the trailer. This arrangement allows the torque bar 128 to apply the necessary torque through the struts 131 (as shown in FIG. 8) to prevent a tongue 160 of the trailer from turning on ball 130. At the other end of the second shaft 152, a second gear 125 is mounted and includes gear teeth 127 to drive a chain around gear 116. The second shaft 152 has journal bearing 126 to support the second shaft 152 within the journal housing 140 and 142. The journal housing 142 is attached to journal housing 140 which in turn is attached to the top plate 118. The dimension ratio of the first gear 116 to the second gear 125 is about 1.4 but could range from about 1.33 to about 1.50.

Figure 2:
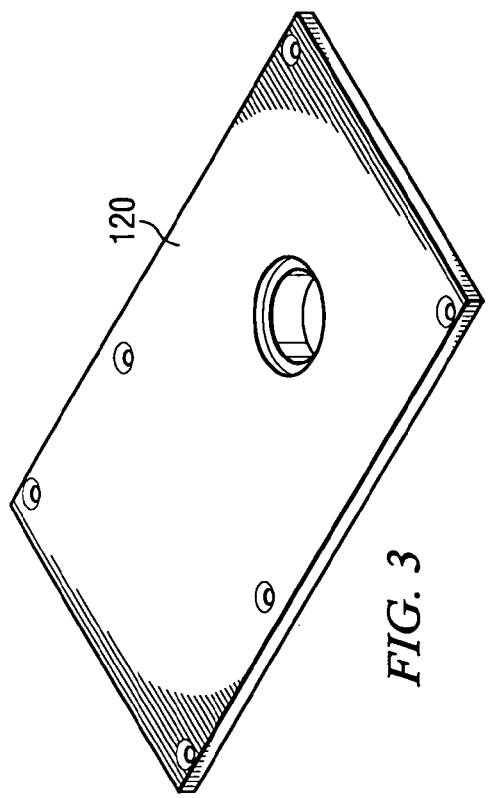
FIG. 2 illustrates a perspective view of the inside of a bottom plate.

The bottom surface of journal housing 142 serves as a bearing surface for the top of the thrust washer 165. The bottom surface of the torque bar 128 serves as a bearing surface for the top of thrust washer 166. The threaded shank 167 of hitch ball 130 is torqued into the threaded core of shaft 152 and draws upward on gear 125 and applies a compression force to preload thrust washers 165 and 166. O-rings 168 and 169 seal the hitch from the elements for example the earth, air and water. Eccentric journal mount 170 fits inside the journal housing 140 and by rotating journal mount 170 during assembly, the distance between shaft 150 and 152 can be adjusted as a means of tensioning the gear chain. This principle of eccentric mounting could be applied to either or both first and second shafts. FIG. 2 shows the inside of the bottom plate 120 and shows the bottom journal housing 144 with a hole to accept the first shaft 150.

Figure 3:
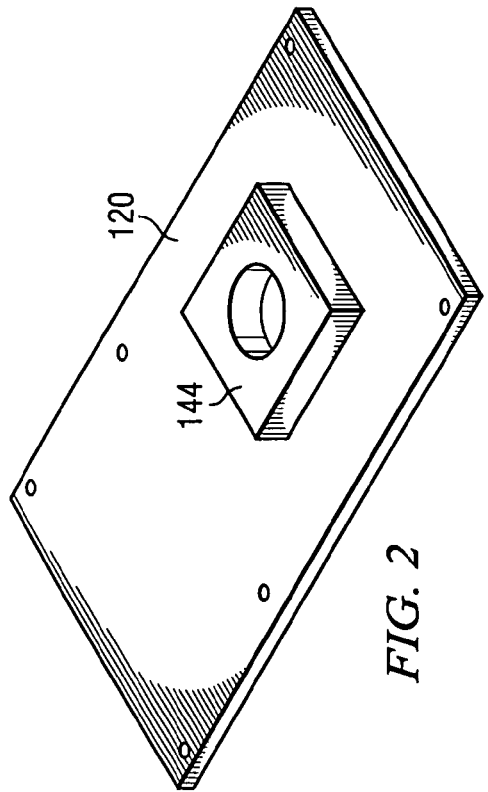
FIG. 3 illustrates a perspective view of the outside of the bottom plate.

FIG. 3 illustrates the outside of bottom plate 120.

Figure 4:
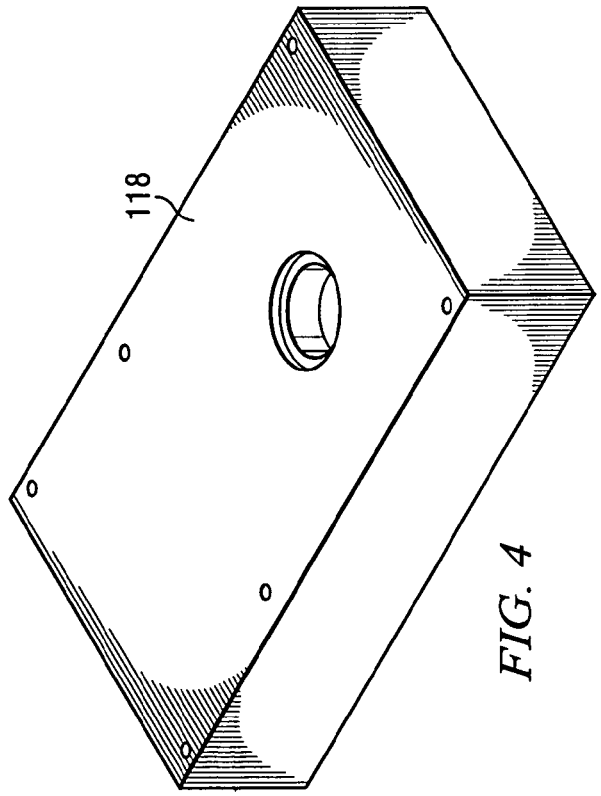
FIG. 4 illustrates a perspective view of the outside of the top plate.

FIG. 4 shows the outside of top plate 118.

Figure 5:
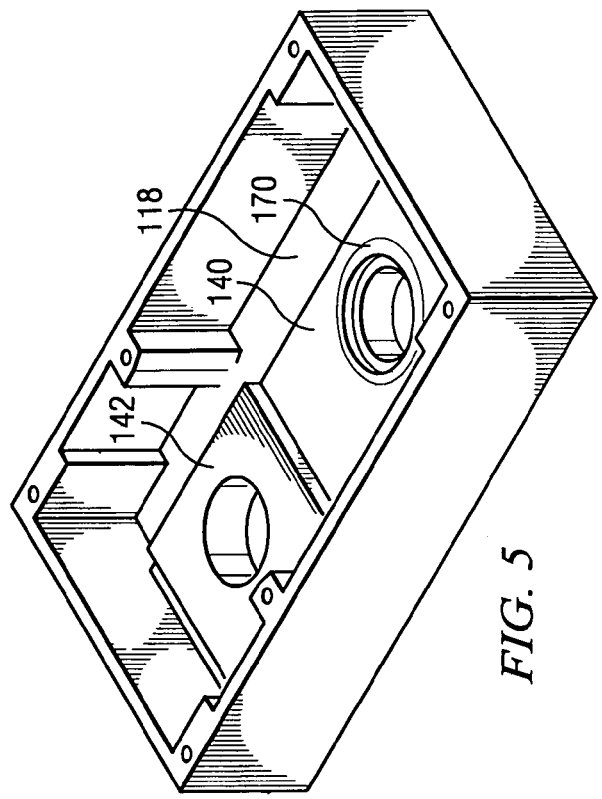
FIG. 5 illustrates a perspective view of the inside of the top plate.

FIG. 5 shows the inside of top plate 118 and shows the top journal housing 140 and 142, eccentric journal mount 170 and the hole for the second shaft 152.

Figure 6:
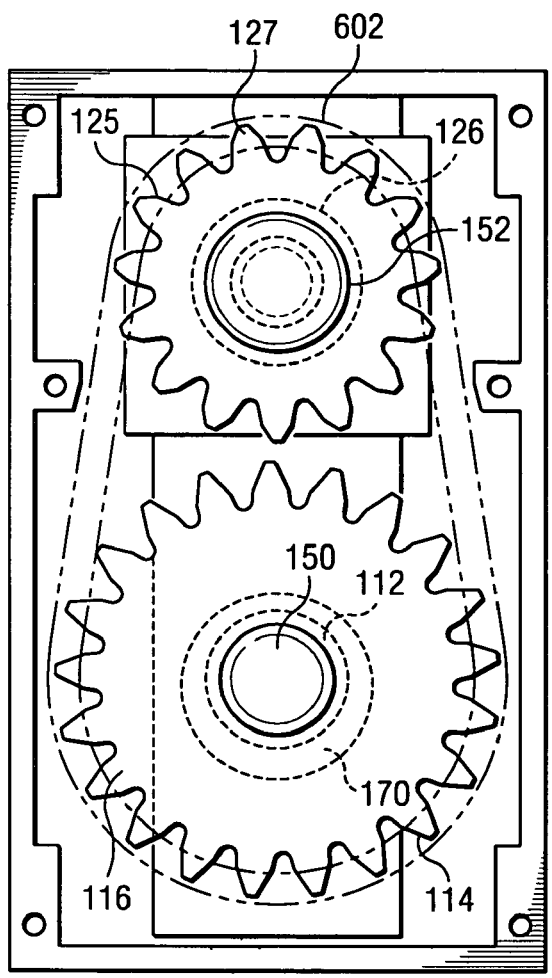
FIG. 6 illustrates a bottom view of the hitch assembly.

FIG. 6 shows the bottom view of the hitch assembly 100 with the first shaft 150 and the second shaft 152 shown in phantom line. The gear 116 is mounted on first shaft 150 with gear teeth 114, and the gear 125 is mounted on the second shaft 152 with gear teeth 127. FIG. 6 additionally shows chain 602 around the gear 116 and the gear 125. The term gear is being used generically and includes sprockets.

Figure 7:
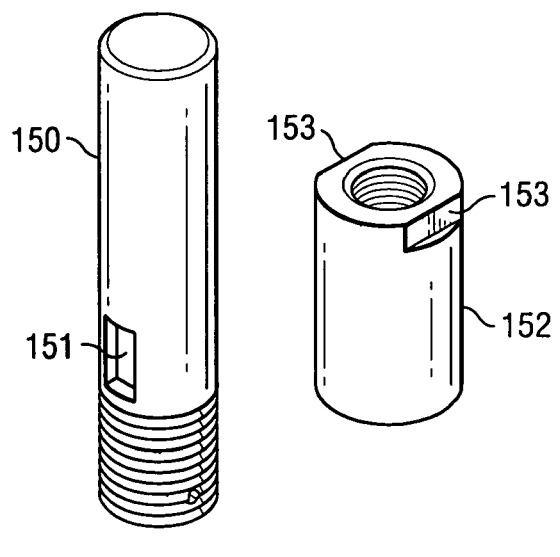
FIG. 7 illustrates a perspective view of the two shafts.

FIG. 7 shows a perspective view of first shaft 150 and second shaft 152. The first shaft 150 includes keyway 151 and a hole for a cotter pin, the second shaft 152 is also shown in perspective view. The second shaft 152 includes flat surfaces 153 for coupling shaft 152 and torque bar 128.

FIG. 8 illustrates the torque bar 128 which is substantially T shaped and includes two arms 129 being substantially perpendicular to the attachment to the second shaft 152.

In operation, the hitch ball 130 is connected to the trailer through the tongue 160 and the torque bar 128, 129 and the struts 131 do not allow the tongue 160 to rotate horizontally with respect to the hitch ball 130. Second shaft 152 rotates around first shaft 150 because the rigid casing of the housing holds them at a fixed distance apart, and the bearings allow rotation. Second shaft 152 rotates about its own vertical axis because the chain forces this rotation of second shaft 152 whenever the second shaft 152 and the rigid housing rotate about first shaft 150. Instead, the hitch ball 130 rotates with the second shaft 152 as does the gear 125 to move the chain 602. As the chain 602 moves, the gear 116 does not turn but remains stationary with respect to the tow bar 102. The housing of the hitch assembly 100 rotates in response to the rotation of the chain 602. As a result, the above mentioned advantages are achieved from the rotation of the housing of the hitch assembly 100.

From the perspective of tow vehicle, the first shaft 150 does not rotate, and the second shaft 152 rotates about the first shaft 150. From the perspective of the trailer, the second shaft 152 and ball 130 etc. do not rotate, but the first shaft 150 and everything fixed to it rotate about the second shaft 152. From the perspective of a fixed point on the earth, both shafts 150, 152 rotate when the hitch is articulating.

Figure 9:
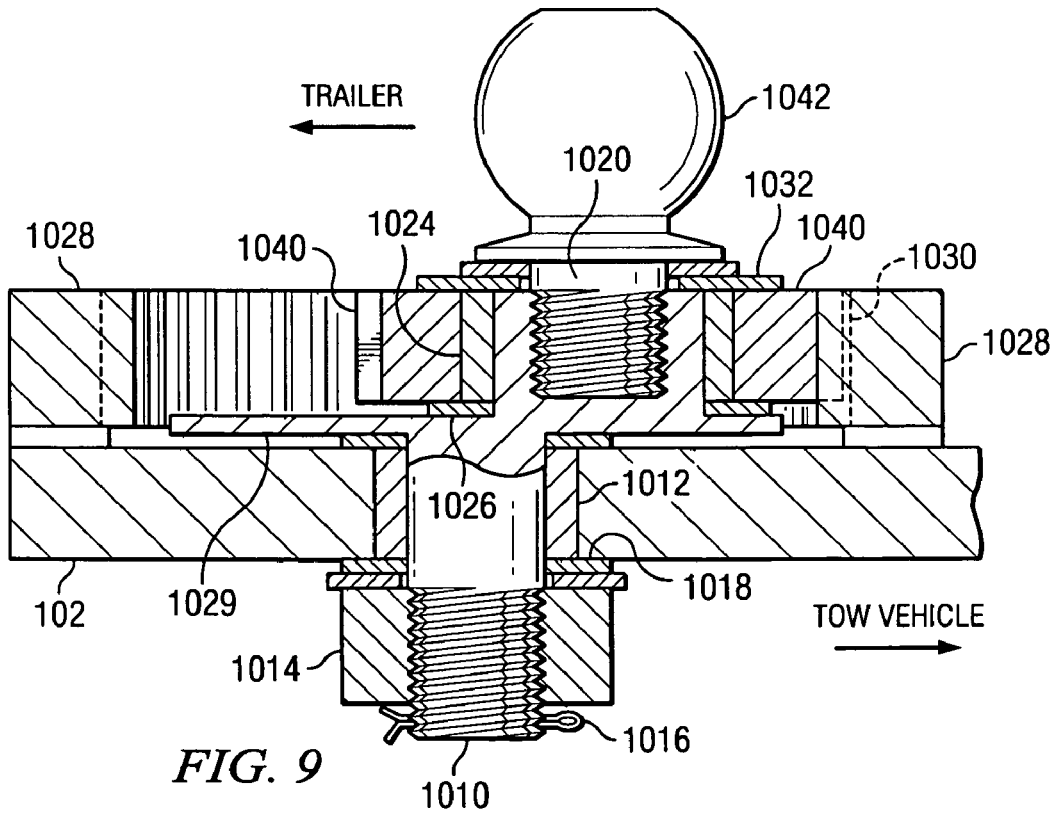
FIG. 9 illustrates a side view of another aspect of the invention.

FIG. 9 illustrates another aspect of the present invention. In this aspect, the gears and shaft rotate in a planetary fashion. FIG. 9 includes first shaft 1010 which rotates and is supported by journal bearing 1012. The first shaft 1010 is retained on the tow bar 102 by thrust washer 1018 and a nut 1014. The cotter pin 1016 retains the nut 1014 on the first shaft 1010.

FIG. 9 additionally illustrates that second shaft 1020 is offset from the first shaft 1010. Both the first shaft 1010 and the second shaft 1020 are attached to the shelf 1029 so that the offset between the first shaft 1010 and the second shaft 1020 is maintained. The first shaft 1010 is compounded with the second shaft 1020 to form a single rigid assembly. The journal bearing 1024 supports rotation of the planetary gear 1040 about the second shaft 1020. The shelf 1029 is spaced from the journal bearing 1024 and the planet 1040 by thrust washer 1026. Furthermore, the shoulders of the hitch ball 1042 are spaced from the journal bearing 1024 and the planet 1040 by thrust washer 1032. The meshing gear teeth 1030 engage the internal gear 1028. The planet 1040 rotates about the second shaft 1020, and the first shaft 1010 rotates in the tow bar 102 by virtue of the journal bearing 1012. Not shown is torque arm fixed to planetary gear 1040 using two struts connected back to the trailer tongue to ensure that the coupler to the tongue cannot rotate horizontally with respect to planet 1040. The tongue of the trailer always keeps the same relative orientation to the planet 1040 as planet 1040 rotates within meshing internal gear 1028 of planet 1040. The ball 1042 rotates about first shaft 1010, and ball 1042 becomes an extension of the second shaft 1020. This aspect of the present invention uses gear ratios with respect to the internal gear 1028 and to plant gear 1040 of approximately 1.5.

Figure 10:
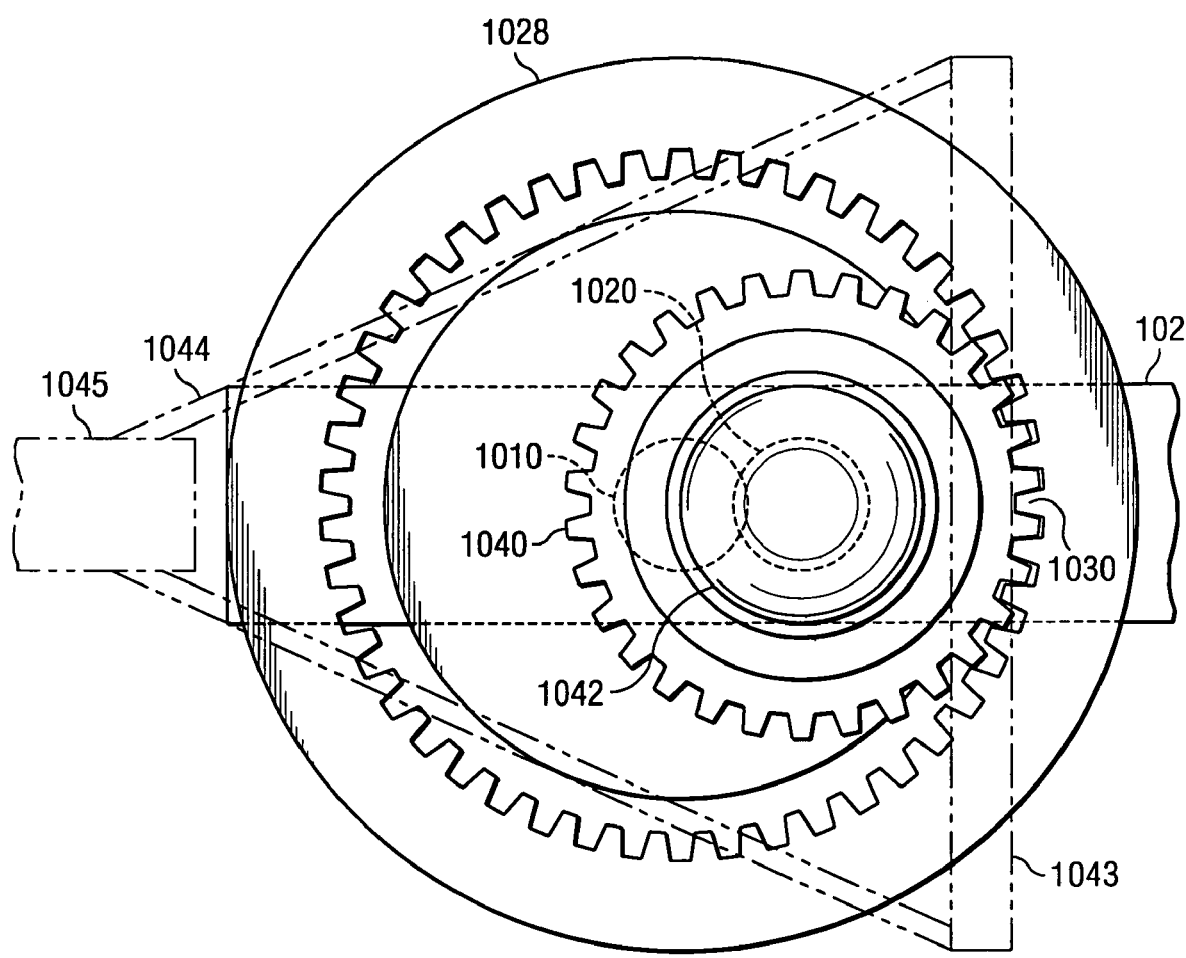
FIG. 10 is a top view of the aspect shown in FIG. 9.

FIG. 10 illustrates a top view of the hitch of FIG. 9. FIG. 10 illustrates the internal gear 1028 adjacent to the planet 1040. FIG. 10 shows the alignment of the internal gear 1028 and the tow bar 102, which are rigidly fixed to the tow vehicle, and planet 1040 and ball 1042 which rotate inside the internal gear 1028 as the hitch articulates during turning movements by the tow vehicle and trailer. FIG. 10 shows the first shaft 1010 in phantom line. FIG. 10 additionally shows the torque bar 1043 that is rigidly fixed to planet 1040 and struts 1044. In operation, hitch ball 1042 is connected to the trailer through tongue 1045, and torque bar 1043 and struts 1044 do not allow the tongue 1045 to rotate horizontally with respect to planet 1040.

While the above embodiments of the present invention have been described in a particular manner, one of ordinary skill in the art would recognize that substitutions and modifications would be contemplated with the teachings of the present invention. Thus, other modifications and substitutions are within the scope of the present invention.

The invention claimed is:

1. A hitch assembly adapted to be connected between a tow vehicle and a trailer, comprising:
    a first shaft adapted to be attached to said tow vehicle, the first shaft being stationary with respect to said tow vehicle;
    a second shaft for mounting a ball to accept said trailer and being rotatable about the first shaft;
    wherein said first shaft and said second shaft are rotatable connected to rotate with respect to each other and wherein said first shaft includes a first gear mounted on said first shaft.

2. A hitch assembly adapted to be connected between a tow vehicle and a trailer as in claim 1 wherein said second shaft includes a second gear mounted on said second shaft.

3. A hitch assembly adapted to be connected between a tow vehicle and a trailer as in claim 1 wherein one of said first shaft or said second shaft is mounted in an eccentric housing to adjust the distance between the first and second shafts.

4. A hitch assembly adapted to be connected between a tow vehicle and a trailer as in claim 1 wherein said first shaft does not rotate with respect to said tow vehicle.

5. A hitch assembly adapted to be connected between a tow vehicle and a trailer as in claim 1 wherein said second shaft does not substantially rotate with respect to said trailer.

6. A hitch assembly adapted to be connected between a tow vehicle and a trailer as in claim 1 wherein said second shaft includes a torque bar to rotate with said second shaft.

7. A tow vehicle and trailer with a hitch assembly, comprising:
    a first shaft adapted to be stationary with respect to said tow vehicle, the first shaft being adapted to rotate about an axis of said first shaft;
    a second shaft for mounting a ball to accept said trailer and being rotatable about the first shaft;
    wherein said first shaft and said second shaft are rotatable connected to rotate with respect to each other, and wherein said first shaft includes a planetary gear.

8. A tow vehicle and trailer with a hitch assembly as in claim 7 wherein said second shaft includes a planetary gear.

9. A tow vehicle and trailer with a hitch assembly as in claim 7 wherein said hitch assembly includes a torque bar.

10. A tow vehicle and trailer with a hitch assembly as in claim 7 wherein said first shaft rotates with respect to a tow bar.

11. A tow vehicle and trailer with a hitch assembly as in claim 7 wherein said first shaft and said second shaft rotate concentrically.

12. A tow vehicle and trailer with a hitch assembly as in claim 9 wherein said torque bar does not rotate with respect to a planetary gear.

13. A method for using a hitch assembly adapted to be connected between a tow vehicle and a trailer, comprising:
    using a first shaft adapted to be attached to said tow vehicle, the first shaft being used to be stationary with respect to said tow vehicle;
    using a second shaft for mounting a ball to accept said trailer and being rotatable about the first shaft;
    wherein said first shaft and said second shaft are used to be rotatable connected to rotate with respect to each other and wherein the step of using the first shaft includes the step of using a first gear on said first shaft.

14. A method for using a hitch assembly adapted to be connected between a tow vehicle and a trailer as in claim 13 wherein the step of using said second shaft includes using a second gear mounted on said second shaft.

15. A method for using a hitch assembly adapted to be connected between a tow vehicle and a trailer as in claim 13 wherein said first shaft is used so as not to rotate with respect to said tow vehicle.

16. A method for using a hitch assembly adapted to be connected between a tow vehicle and a trailer as in claim 13 wherein said second shaft is used so as to rotate with respect to said tow vehicle.

17. A method for using a hitch assembly adapted to be connected between a tow vehicle and a trailer as in claim 13 wherein said second shaft is so as not to substantially rotate with respect to said trailer.

18. A method for using a hitch assembly adapted to be connected between a tow vehicle and a trailer as in claim 13 wherein said second shaft is used with a torque bar to rotate with said second shaft.

19. A method for using a hitch assembly adapted to be connected between a tow vehicle and a trailer, comprising:
    a first shaft adapted to be attached to said tow vehicle, the first shaft being at a fixed relationship with respect to said tow vehicle and to rotate about an axis of said first shaft;

a second shaft for mounting a ball to accept said trailer and being rotatable about the first shaft and wherein said first shaft includes a first gear mounted on said first shaft.

20. A method for using a hitch assembly adapted to be connected between a tow vehicle and a trailer, as in claim 19 wherein said second shaft does not rotate about an axis of said second shaft.

21. A method for using a hitch assembly adapted to be connected between a tow vehicle and a trailer as in claim 19 wherein a torque bar is attached to a planetary gear.

22. A method for using a hitch assembly adapted to be connected between a tow vehicle and a trailer, as in claim 19 wherein said second shaft is connected to the ball.

* * * * *